United States Patent Office 3,431,922
Patented Mar. 11, 1969

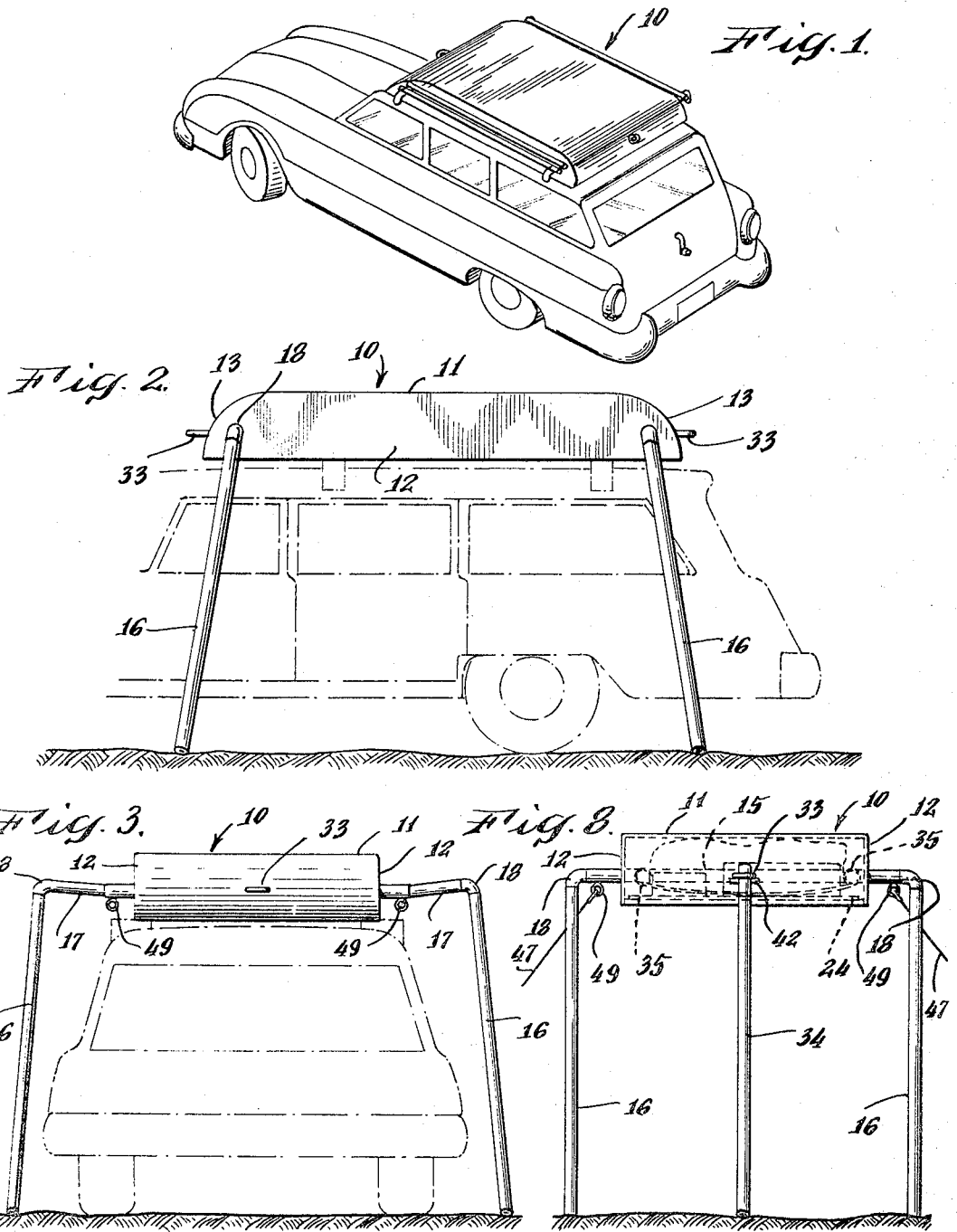

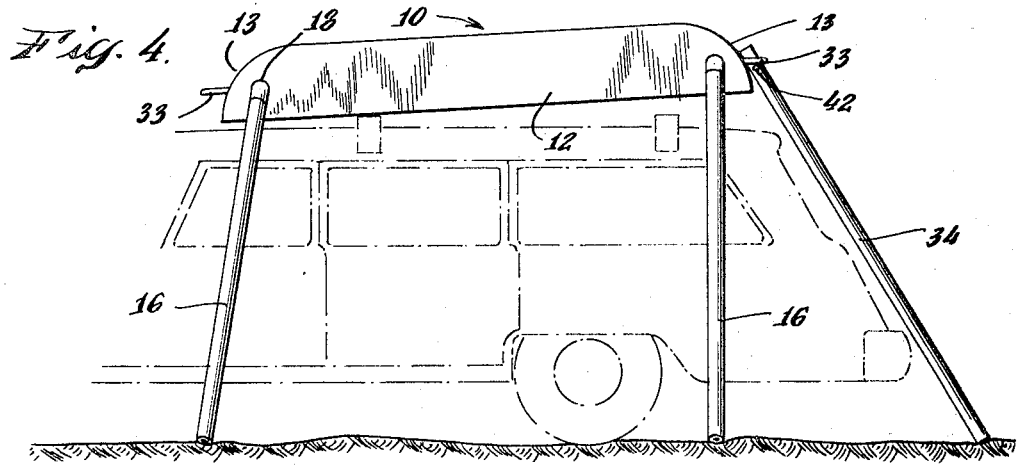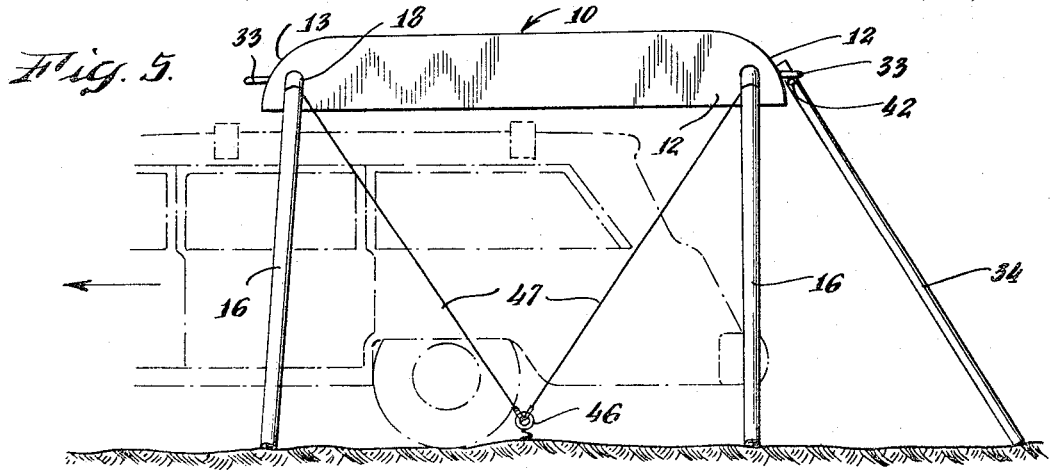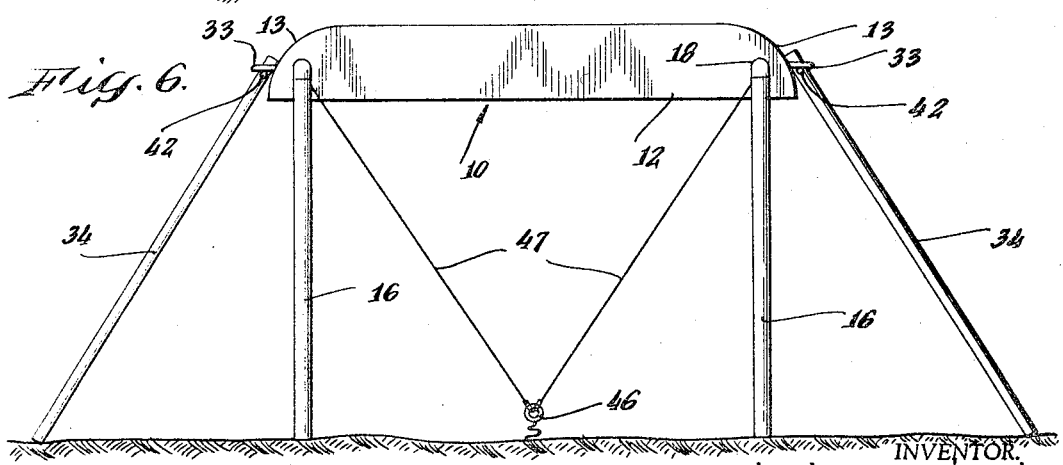

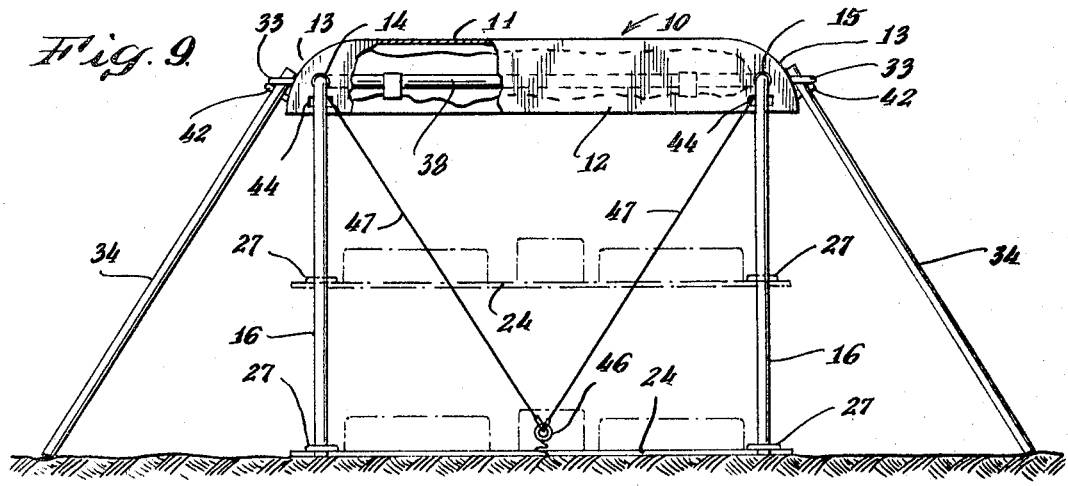
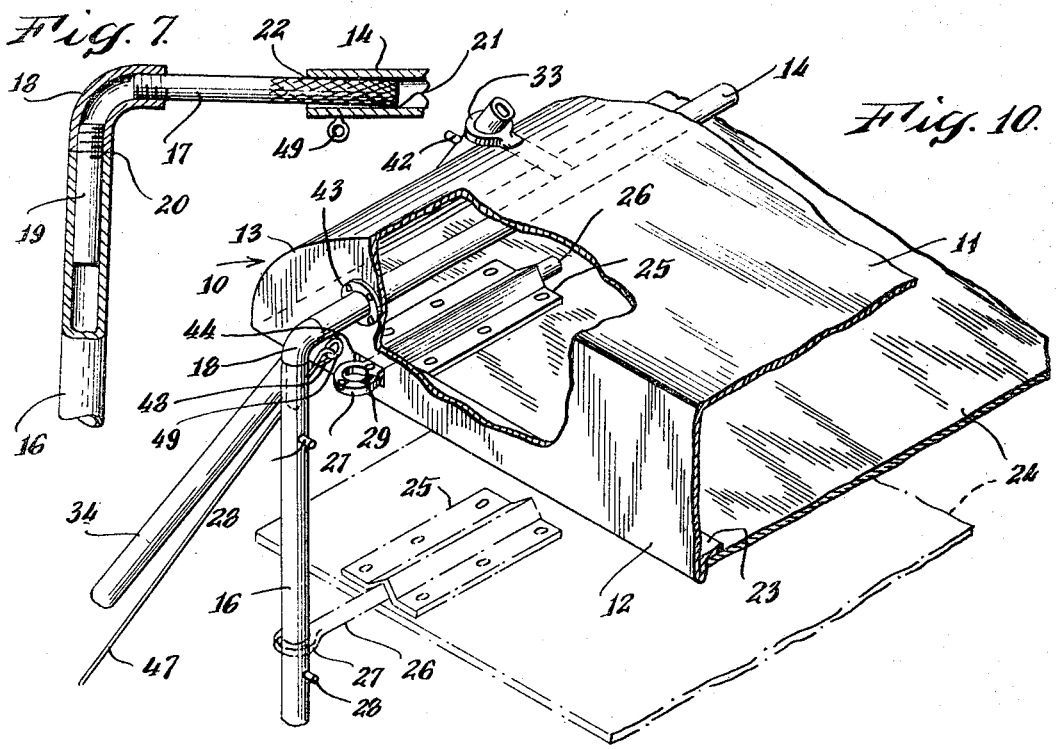
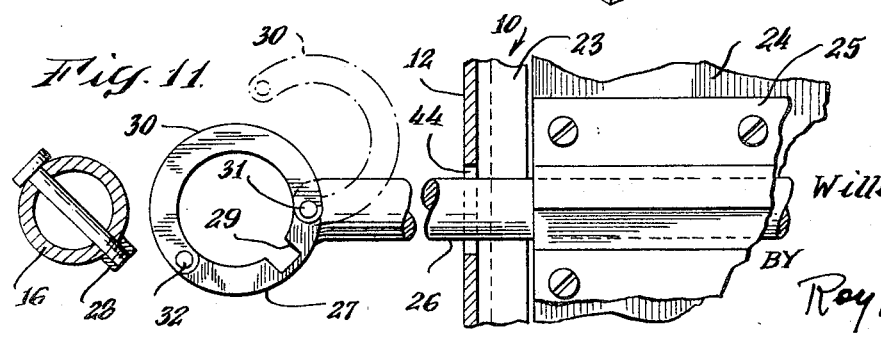

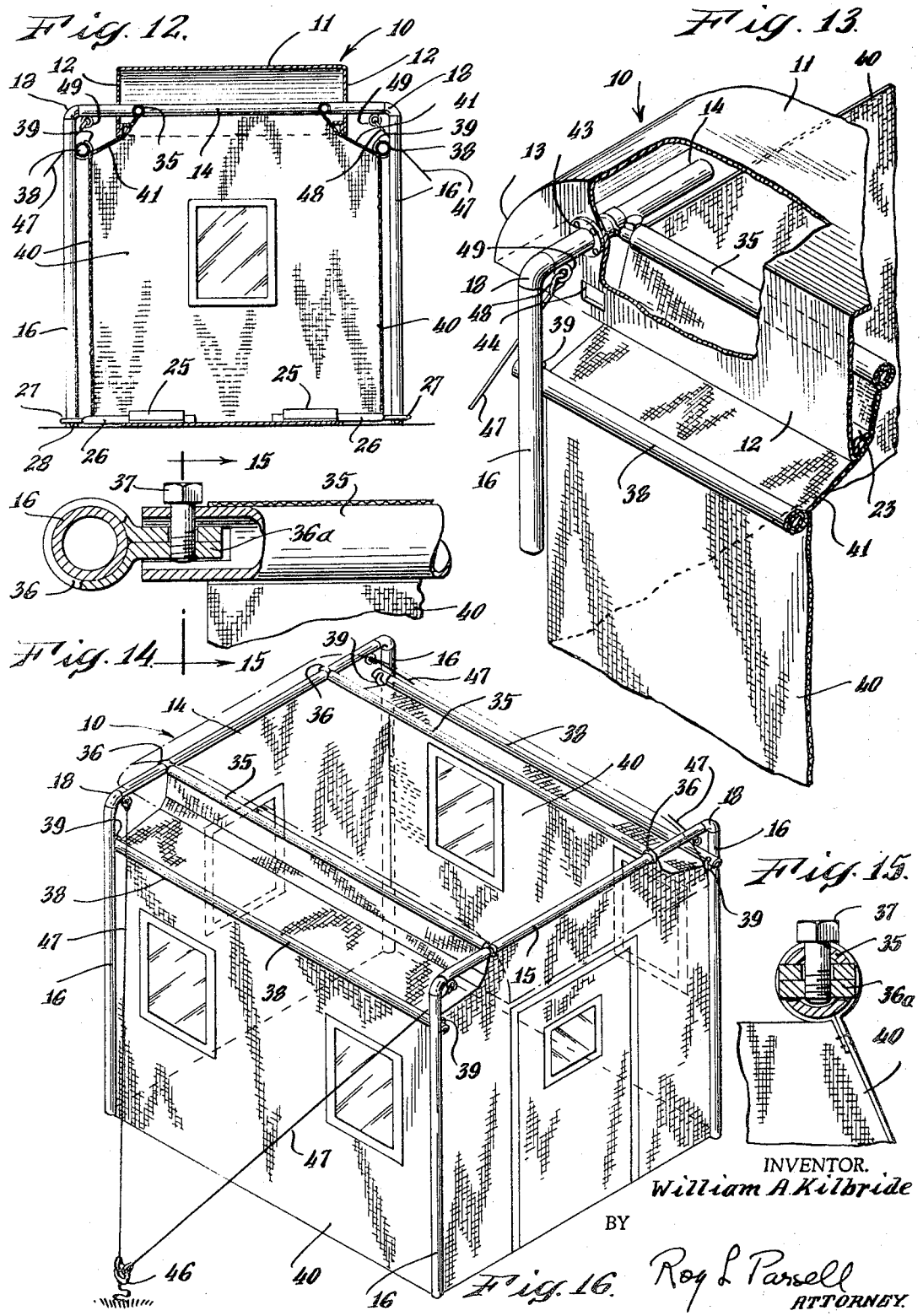

3,431,922
VEHICLE SHELTER AND ARTICLE CARRIER
William R. Kilbride, 48 Lakeside Drive,
Guilford, Conn. 06437
Filed Feb. 26, 1968, Ser. No. 708,078
U.S. Cl. 135—1     13 Claims
Int. Cl. A45f 1/12, 1/16

ABSTRACT OF THE DISCLOSURE

A demountable compartment which can be carried on the top of a vehicle for holding luggage and other articles and forming a roof portion of a shelter for the vehicle or persons.

Structural supporting members together with special fastening means enable the compartment to be easily raised, lowered, and assembled with wall members to provide an enclosed shelter which among other things can be used for camping purposes.

---

This invention relates to a portable structure for holding luggage and other articles which is placed on the roof of a vehicle. Support poles are removably attached to the cover portion for raising and lowering the cover portion and suspending the cover portion when the vehicle is moved away and when so attached form a framework which can be covered with wall members to form a shelter for persons or the car.

Therefore one object of my invention is to provide an article carrier which is easily mounted and dismounted on the roof of a vehicle.

Another object of my invention is to provide a demountable structure which supports an article carrier and a shelter.

Another object of my invention is to provide a demountable combination of structural members for supporting walls of a shelter for living and sleeping purposes.

Yet another object is to provide structural and fastening members which can be easily assembled and dissembled and of light weight.

Still another object is to provide the necessary component members at a low cost.

Other objects and a fuller understanding of the invention may be had by referring to the following description and claims, taken in conjunction with the accompanying drawings in which:

FIGURE 1 is a perspective view showing my invention adapted to a passenger vehicle;

FIGURE 2 is a longitudinal elevation showing the first step in dismounting the cover portion of my invention;

FIGURE 3 is a vertical rear end elevation of the structure shown in FIGURE 2;

FIGURE 4 is a vertical side elevation of the second step in dismounting;

FIGURE 5 is a vertical side elevation of the third step in the dismounting;

FIGURE 6 is a vertical side elevation of the fourth step in the dismounting;

FIGURE 7 is a vertical elevation partially in section showing the top connection of a vertical support with a horizontal tubular member of the cover portion;

FIGURE 8 is an end elevation of the fourth step shown in FIGURE 6;

FIGURE 9 is a longitudinal elevation showing the fifth step of the dismounting;

FIGURE 10 is a perspective view partially sectioned to show a portion of the fastening elements;

FIGURE 11 is a plan view somewhat enlarged and partially in section showing a portion of the fastening elements shown in FIGURE 10;

FIGURE 12 is an elevation of one end of my invention showing a portion of the enclosure member in place;

FIGURE 13 is a perspective view partially sectioned to show some of the structural members, fastening means and a portion of the enclosing walls;

FIGURE 14 is a plan view partially in section showing a pair of structural members and fastening means for securing them together;

FIGURE 15 is a sectional view taken on line 15—15 of FIGURE 14; and

FIGURE 16 is a perspective view of my invention showing the walls of the shelter in place.

Referring now to the drawings numeral 10 denotes the cover portion in general having an elongated unitary top panel 11 with depending side portions 12 and end portions 13.

The panel 11 and depending sides 12 and ends 13 are preferably made of sheet aluminum but any suitable material may be used, as for example plywood.

A tubular member or front sleeve 14 (FIGURES 9 and 10) extends transversely through the cover portion 10 extending outwardly from both sides 12 for a distance of about one foot. A second or rear sleeve 15 is similarly located adjacent the rear end portion 13 of the cover portion.

Four upright tubular supports 16 are placed at each of the four corners of the cover portion 10 for purposes of raising, lowering and suspending the cover portion 10 as will presently be described.

Each tubular support 16 is provided with a lateral offset portion 17 which is received in the ends of the respective sleeves 14 and 15.

This offset portion 17 is also a tube secured to the upright portion of the support 16 by being threaded into an elbow 18 the latter to be mounted on upright support 16 in the following manner. A short nipple 19 is threaded into the other end of elbow 18 and extends downwardly a short distance into upright 16. The engaging surfaces 20 between the bottom of the elbow 18 and the top of the upright 16 are dressed off smoothly so that the upright 16 may rotate relative to the elbow 18 for purposes to be later explained.

The offset 17 (FIGURE 7) is of a smaller diameter than that of sleeves 14 or 15 so that due to this clearance between the outside diameter of offset 17 and inside diameter of the sleeves 14 or 15 the axes of the offset 17 and sleeves 14–15 will be oblique to each other as clearly shown in FIGURE 7. The ends 21 and 22 of offset 17 and sleeves 14–15 are dressed off so that a sharp edge 21a on offset 17 engages the inner surface of sleeves 14–15 respectively and in a like manner the edge 22 engages the outside surface of offset 17. The sharp edges 21 and 22 grip the respective surfaces which they engage and serve to resist any unintended axial movement of the offsets 17 to the sleeves 14–15. To further insure this resistance the outside diameter of offset 17 may be knurled.

It will be obvious at this point that the offset portions 17 permit lateral spacing of the upright supporting members 16 to clear the sides of the vehicle when in place and furthermore to enable the foot of the upright 16 to be placed in the most desirable spot on the ground. Also by using telescoping members it is very easy to adjust the uprights 16 to the desired spacing. Yet another advantage is obtained by providing a substantial clearance between the inside diameter of sleeves 14 and 15 and the outside diameter of offset member 17 so that under the weight of the top panel or cover member 11 the axes of offset member 17 and sleeves 14 or 15 will be oblique and cramp the engaging surfaces so that the sharp end edges will bite into the surfaces and restrain undesired axial movement. This results in a simple inexpensive adjustable holding means.

I form a shoulder or ledge 23 (FIGURE 10) extending inwardly at the bottom edges of sides 12 and ends 13 to receive therebeneath a floor panel or deck 24 preferably of plywood as shown in FIGURE 10.

To hold the floor 24 in place at any desired elevation as desired I provide brackets 25 mounted on the upper surface of the floor 24 to receive arms 26 which terminate at their outside ends into a loop member 27 which member encircles upright 16 respectively and are guided thereby. I insert studs 28 at various vertical intervals in uprights 16 on which the loops 27 may rest. I also provide a notch 29 extending from the inner diameter of the loop 27 to clear the studs 28 in the uprights 16 when the uprights are rotated for this purpose so that the floor 24 may be raised or lowered.

To assist in the assembly of the arm 26 to the upright 16 I provide a split in loop 27 as shown in FIGURE 11 whereby one-half of loop 27 swings on axis pin 31 to open and close the loop and is held in closed position by detent means 32.

When the cover portion 10 with floor 24 are assembled and reposing on the roof of the vehicle, arms 26 are inserted through apertures 44 in side portions 12 and then brackets 25 to retain the floor 24 in place during transit and when dismounting from the vehicle. This dismounting procedure being subsequently described in detail.

I provide an eyebolt 33 extending through end panels 13 to be threaded into sleeves 14 and 15 respectively as shown most clearly in FIGURES 8 and 10. The eyebolts 33 not only secure the sleeves 14 and 15 to the ends 13 respectively but the eye provides a means for holding end braces 34 as shown in FIGURES 8, 9, and 10.

The mounting and dismounting of the cover portion will be described subsequently. Starting first with the dismounting procedure, refer to FIGURE 1 showing the cover portion 10 resting on the top of a vehicle where it is held by any suitable means not shown. However the uprights 16 and the end braces 34 are carried (FIGURE 1) when not in use, resting on the protruding ends of sleeves 14 and 15 where they are held by straps (not shown).

The four uprights 16 are placed in positions as shown in FIGURES 2 and 3 with the offsets 17 inserted in the sleeves 14 and 15 respectively (see also FIGURES 7 and 10).

Due to the length of the uprights 16 they assume an oblique position as shown in FIGURES 2 and 3.

By raising one end of cover portion 10, as for example that shown in FIGURE 4, the uprights assume a vertical position. This raising may be accomplished by first seizing one upright and pulling it into a vertical position and then proceeding to do the same with the opposite upright.

Rear end brace 34 is then inserted in eyebolt 33 but this brace is longer and reposes in an oblique position as shown in FIGURE 4.

A similar procedure may be followed with the front end as shown in FIGURE 5.

The cover portion 10 is now clear of the vehicle and the latter is moved forward from beneath the cover portion 10 and the front end brace put into position through front eyebolt 33 as shown in FIGURES 6 and 8.

With the cover portion 10 and the uprights 16 in position as shown in FIGURES 7 and 8, the floor 24 is connected to the uprights by means of arms 26 as shown in FIGURE 10 and the floor may be lowered in stages as desired as shown in FIGURE 9 by rotation of the uprights 16 as previously described.

The contents of the cover portion 10 may now be removed and the floor 24 returned to its position in cover portion 10 or lowered to the ground for purposes to be subsequently described.

With the cover portion 10 suspended and braced by uprights 16 and end braces 34 and the floor 24 resting on the ground the framework can be enclosed by suitable wall material to provide a shelter for persons or the vehicle may be returned to position and the shelter used to protect the vehicle from the weather elements. An embodiment for use as a shelter for persons will now be described.

Referring now to FIGURES 12 through 15, numeral 35 renotes a pair of tubular ridge poles connecting sleeves 14 and 15. Any suitable means may be used, however in the preferred form a clamp member 36 surrounds sleeve 14 or 15 having an elongated pair of ends 36a between which are inserted the ends of ridge pole 35 which have been flattened. A clamp screw 37 threaded into one end of clamp member 36a is then tightened to secure the flattened end of ridge pole 35 between the pair of ends 36a.

Tubular hip poles 38 are connected between the pairs of uprights 16 as shown in FIGURES 13 and 16. Any suitable means may be used, however, the preferred embodiment comprises a hook 39 (FIGURE 13) screwed into upright 16 to receive the end portion of hip pole 38.

A flexible wall medium 40 is prepared in and attached to the ridge poles 35, hip poles 38 and sleeves 14 and 15 by forming long loops on hems 41 in the medium 40 through which the ridge poles 35 and hip poles 38 are inserted before being connected to uprights 16 and sleeves 14 and 15 respectively and the sleeves 14 and 15 inserted before being assembled to the sides 12.

Instead of flexible material in one continuous piece I may use rigid or semi-rigid panels of sheet aluminum, plastic or other material and mount them to the ridge and hip poles respectively as well as to the sleeves 14 and 15.

Suitable openings for windows and doorways may be provided as desired.

The mounting of cover portion 10 will now be described. Cover portion 10 is placed on the ground in the position selected to subsequently be occupied by the vehicle.

The two rear supporting members 16 are connected to sleeves 15 and the two front supporting members 16 are connected to sleeves 14. The rear part of cover portion 10 is then raised by lifting it or moving the supporting members 16 into a generally vertical position. End brace 34 is then inserted in eyebolt 33 and set up to brace the structure.

Next the front end is raised in a manner similar to that just described including positioning of front end brace 34.

The floor 24 is then set up with arms 26 connected to uprights 16. Luggage or other articles to be carried are placed on the floor 24 and the floor raised to engage the cover portion 10.

The vehicle is now moved in place after removing front brace 34 and the cover portion 10 with floor 24 lowered to rest on the top of the vehicle.

Arms 26 are now removed from engagement with uprights 16 and replaced by inserting them through apertures 44 in the sides 12 of cover portion 10 thus securing floor 24 to cover portion 10.

The upright members 16, end braces 34, ridge pole 35 and hip poles 38 may now be placed respectively on the protruding ends of sleeve members 14 and 15 where they are secured by any suitable means (not shown) and the compact assembled structure is ready for transit.

I do not limit myself to telescoping members having a circular cross section as rectangular or other cross sections may be used.

Furthermore end braces may not be necessary if the adjustable means connecting the uprights 16 to sleeves 14 and 15 is adequate.

In another embodiment, which I prefer, I provide my shelter with a stay means which is shown most clearly in FIGURES 6 and 16. I set a ground anchor 46 (FIGURE 16) about two or three feet outwardly from a line between the uprights 16 and at a point on this line half way between these uprights. This anchor 46 may take the form of a screw so that it can be rotated to feed into the ground or it may be an ordinary tent stake.

I attach one end of a stay member 47 by means of a snap hook or other suitable means to an eye 49 secured to the outer end portion of each of the transverse supporting members 14 and 15, and the other end to the ground anchor 46 which for convenience may have an eye or notch for making the attachment. I prefer a flexible stay 47 such as a rope but a tube or rod may be used. The chief advantage of the flexible stay 47, such as a rope, is that it is easy to tighten it up to secure a balance when stays are used at the four corners. By using a rigid stay 47 I am able to get along with less number of stays, as for example at diagonally opposite corners. When using these stays 47 in my preferred embodiment I may omit the end braces 34. The use of these stays 47 also makes the structure more rigid and insures against collapse due to heavy winds. I do not wish to limit my stays to one side only as they may also be used on all four sides of my shelter if desired.

What is claimed is:

1. A demountable accessory for a vehicle for providing a shelter and other uses for campers and the like, comprising a cover member having a roof panel, opposite side walls depending therefrom and forming an open portion of the cover member between the side walls; a transverse supporting member mounted at each of two opposite end portions of said cover member for receiving upright supporting members adjacent the respective ends thereof; upright supporting members for maintaining said cover member in spaced relation to the ground; means for adjustably connecting said upright supporting members to said transverse supporting members comprising an offset portion extending laterally from the upper end of each said upright supporting member to engage said transverse supporting member; said offset portion and said transverse supporting member telescoping one another with the inside diameter of one telescoped member substantially greater than the outside diameter of the other member; said difference in diameters being such that the axes of the respective telescoped members are oblique to each other to cramp the engaging members under the weight of said cover member whereby a portion of the end edge of one member grips a portion of the surface of the other member to resist axial movement of said members relative to each other; the upright supporting members being of such length that when said cover member is reposing on said vehicle said upright supporting members are in an oblique relation to the general plane of said cover member and when said cover member is raised above said reposing position said upright supporting members approach a condition of perpendicularity with said general plane; and means for preventing movement of said cover portion in a plane generally normal to the axis of one of said telescoping members.

2. In the device of claim 1 means for enclosing the shelter comprising hip pole members connected between each of opposite pairs of said upright supporting members; means for connecting said hip pole members to said upright supporting members; roof wall members enclosing the space between the cover member and respective hip pole members having one portion of said roof wall members being supported by said hip pole members and the opposite portion by means connected with said cover member.

3. In the device of claim 2 means for supporting said other portion of the roof wall member comprising a pair of ridge pole members connected between said transverse supporting members and means for attaching said other portion to said ridge pole members.

4. In the device of claim 2 side wall members depending from said hip pole members.

5. In the device of claim 2 side wall members depending from said cover member.

6. In the device of claim 2 side wall members depending from said ridge pole members.

7. In the device of claim 2 side wall members depending from said transverse supporting members.

8. In the device of claim 1 a floor means adjustable relative to said walls of said cover member comprising a floor panel, a plurality of arms slidably mounted on said floor panel and extending laterally therefrom for sliding engagement with said upright supporting members respectively for holding and guiding said floor panel relative to said side walls and means to retain said floor panel in a desired position.

9. In the device of claim 8 said means for retaining said floor member in a desired position comprising a plurality of studs spaced longitudinal along said upright support member; said arm member having a loop portion at one end thereof to receive said upright support member in sliding engagement with said upright supporting member and with respective said studs; a clearance notch in said loop to receive and allow said stud to pass through for raising or lowering said floor member when said upright member is so positioned relative to said notch.

10. In the device of claim 1 means for connecting said upright supporting member and said offset portion comprising an elbow member; said offset portion mounted in said elbow member; and a nipple member mounted in said elbow member for engagement with the upper end of said upright supporting member whereby said upright supporting member is rotatable relative to said elbow member.

11. In the device of claim 1 said means for preventing said movement of the cover portion comprising a brace member connected with a portion of said cover portion at one end thereof and having the other end in retaining engagement with the ground and means for connecting said brace member to said cover portion.

12. In the device of claim 11 said means for connecting said brace member with said cover portion comprising a link member fixedly mounted at one end thereof on said transverse supporting member to receive said brace member and at the other end having means for detachably securing an end portion of said brace member.

13. In the device of claim 1 means for anchoring the shelter to the ground when said cover member is in a raised position comprising a stay member, said stay member disposed to extend from a said transverse supporting member to a ground locus outside of the area of a horizontal cross section of the shelter projected on the ground, means for connecting one end of said stay member to said transverse supporting member and means for anchoring the other end of said stay member to the ground at said locus.

References Cited

UNITED STATES PATENTS

| | | | |
|---|---|---|---|
| 3,095,231 | 6/1963 | Reed | 135—1 |
| 3,111,955 | 11/1963 | Green | 135—1 |
| 3,254,657 | 6/1966 | Reger | 135—1 |
| 3,255,768 | 6/1966 | Lowe | 135—1 |

PETER M. CAUN, *Primary Examiner.*